United States Patent Office 3,060,512
Patented Oct. 30, 1962

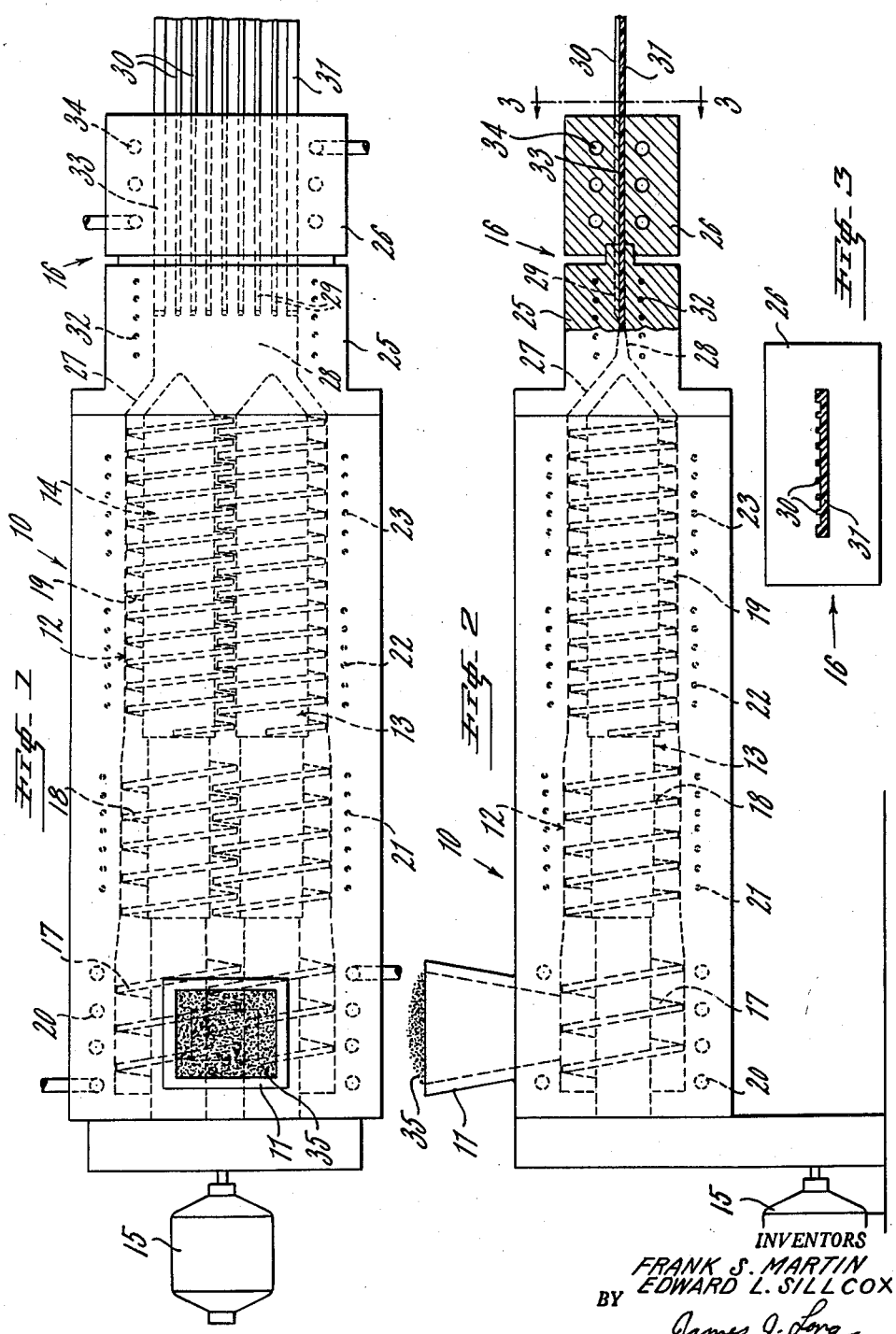

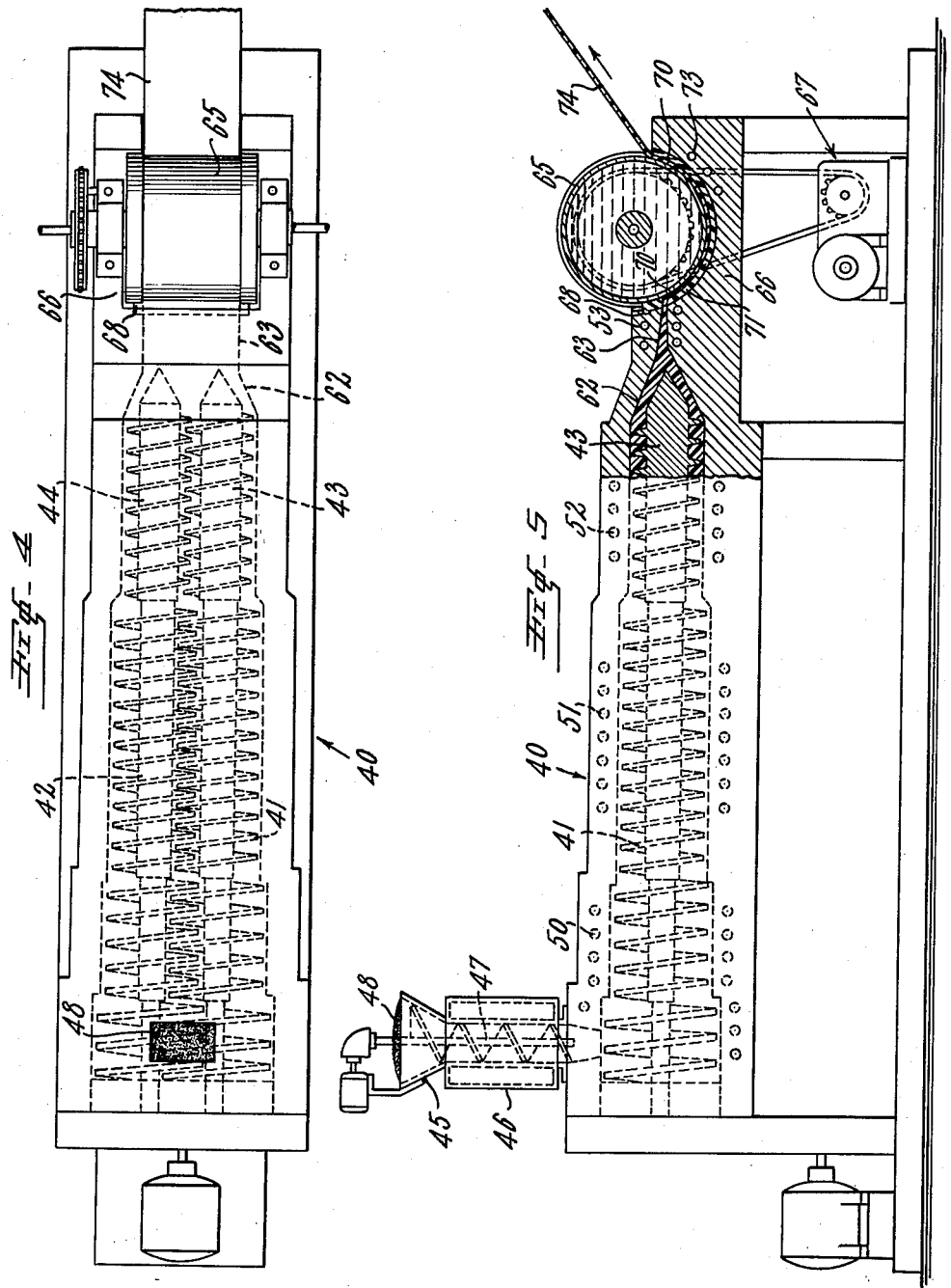

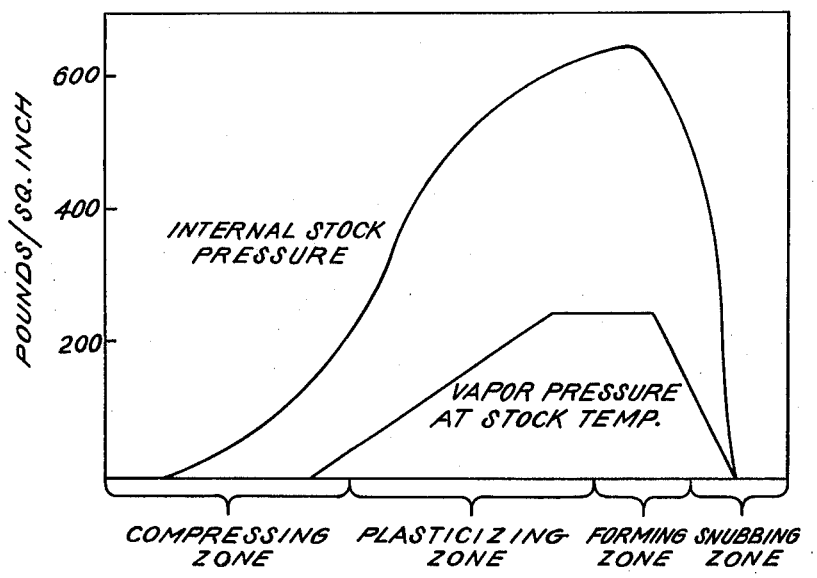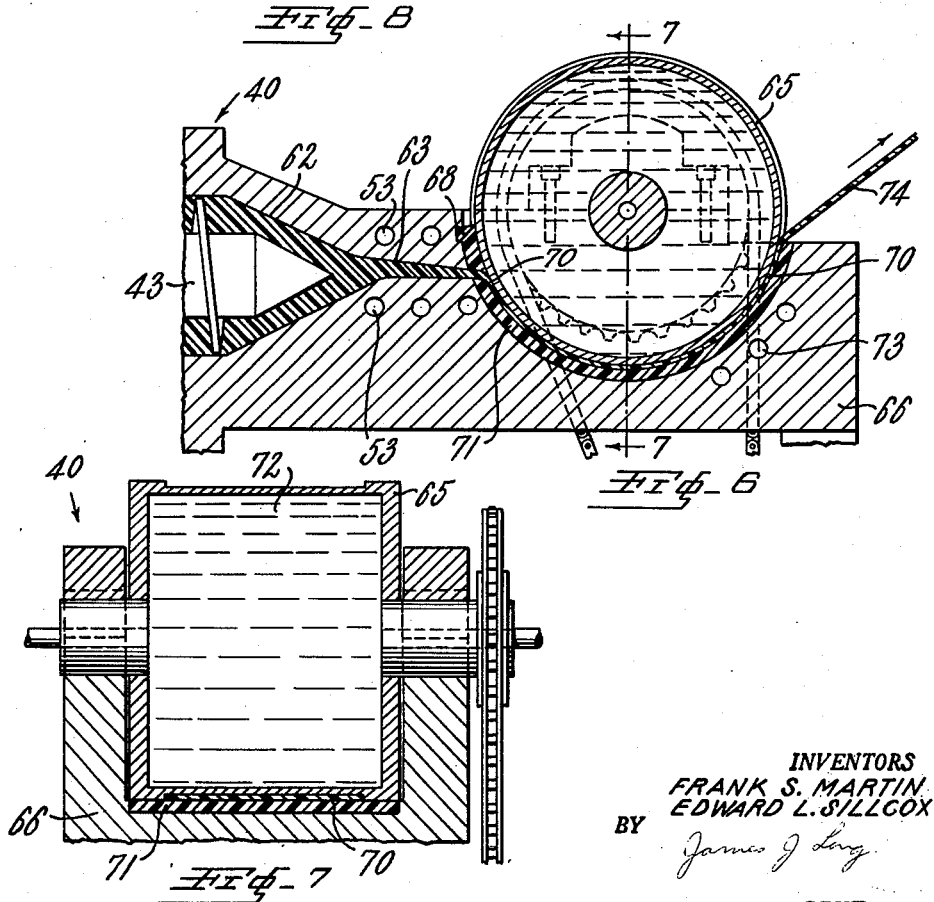

3,060,512
SOLVENTLESS EXTRUSION METHOD FOR MAKING SHAPED MICROPOROUS ARTICLES FROM THERMOPLASTIC RESINOUS MATERIAL
Frank S. Martin, Cranston, R.I., and Edward L. Sillcox, Cedar Grove, N.J., assignors to United States Rubber Company, New York, N.Y., a corporation of New Jersey
Filed May 25, 1959, Ser. No. 815,714
5 Claims. (Cl. 18—48)

This invention relates to a new method of making microporous material, and more particularly it relates to a solventless extrusion method of making shaped microporous articles from thermoplastic resinous material.

This application is a continuation-in-part of our application Serial No. 515,455, filed June 4, 1955, now abandoned.

A principal use of the microporous material made in accordance with the invention is in electrical storage batteries. The manufacture of microporous battery separators from a thermoplastic resin presents certain problems. Thus, the conventional methods of making hard rubber battery separators (such as, for example, the method described in U.S. Patent 2,329,322, issued September 14, 1943 to Baty et al.) depend upon vulcanization, under non-evaporative conditions, of a mixture of vulcanizable rubber stock and hydrous silica gel. Such methods are not operative with thermoplastic resins, which are not vulcanizable. Therefore, different methods have to be devised for making battery separators from thermoplastic resins.

Because of the inapplicability, to thermoplastic resin battery separators, of the prior art vulcanizing methods for making rubber separators, it has been proposed to make thermoplastic resin battery separators by at least two other methods. One such method depends upon mixing vinyl resin with a volatile solvent and a finely divided filler, such as starch, shaping the mixture, removing the solvent, and subsequently leaching out the finely divided material, to leave numerous small pores in the mass (U.S. Patent 2,707,201, Fernald et al., April 26, 1955). In another method a mixture of vinyl resin, volatile solvent and hydrous silica gel is shaped by extrusion, the solvent is removed under non-dehydrating conditions, after which the resulting separator may be dried (U.S. Patent 2,772,322, Witt et al., November 27, 1956).

It has been desired to provide a still more improved method, which would eliminate certain of the disadvantages of the methods just described. Thus, it is a principal object of the present invention to provide a method of making a shaped microporous structure from a thermoplastic resin, which does not depend on the use of solvents. The use of solvent, with its attendant solvent-recovery equipment, not only represents an expense and inconvenience, but also presents a toxicity and/or fire hazard. The present invention provides a method which dispenses with the use of solvent.

The invention will be described in more detail with reference to the accompanying drawing, wherein:

FIG. 1 is a diagrammatic plan view of an extrusion device suitable for use in practicing the method of the invention;

FIG. 2 is a longitudinal elevational view of the device of FIG. 1 with parts broken away;

FIG. 3 is an end view taken along the line 3—3 of FIG. 2;

FIG. 4 is a diagrammatic plan view of a modified extrusion device suitable for use in practicing the invention;

FIG. 5 is a longitudinal elevational view of the device of FIG. 4 with parts broken away;

FIG. 6 is an enlargement of a portion of FIG. 5;

FIG. 7 is an elevational sectional view taken along the line 7—7 of FIG. 6; and, FIG. 8 is a graph illustrating approximate relative pressure conditions existing during various stages of the process.

Examples of solid thermoplastic resinous materials that may be employed in the invention include polyvinyl chloride or copolymers of vinyl chloride with other materials, polyethylene polystyrene, polyacrylonitrile, polymethyl acrylate, etc. These resins are immiscible with water. The preferred resinous material is vinyl chloride polymer, typically the ordinary hard, rigid, gamma vinyl chloride homopolymer resin of commerce. In practice, the vinyl chloride polymer is frequently modified somewhat in properties by copolymerizing the vinyl chloride with a small amount (e.g., up to 15%) of a copolymerizable monoethylenically unsaturated monomer, usually vinyl acetate, although vinylidene chloride is also used for this purpose. A somewhat similar modification of the physical properties of the vinyl chloride resin may sometimes be achieved by adding a small amount of such a polymer as polyvinyl acetate to the polyvinyl chloride. The resin may be compounded with minor amounts of plasticizers and with the usual stabilizing or other modifying ingredients, and it is sometimes advantageous to include suitable amounts of an appropriate filler. For the sake of convenience and brevity, the various foregoing compounded vinyl chloride polymers or copolymers will be referred to hereinafter as vinyl chloride resins.

In the typical practice of the invention, the resinous vinyl chloride polymer or other thermoplastic resin is charged to an extrusion device along with silica hydrogel. Usually the thermoplastic resin and the silica hydrogel are in particulate form and they are ordinarily preblended to form a uniform, substantially freely flowing mixture, which may also contain small amounts of pigment or other suitable componding ingredients. At the entrance or charging zone of the extruder, the vinyl resin and silica hydrogel are compacted and advanced into the extruder while being cooled to prevent the mix from becoming heated at this stage by conduction of heat from the subsequent heated portions of the extruder.

The mixture is progressively compacted and advanced from the cooled entrance zone into a subsequent stage of the extrusion device wherein heating is commenced, the mix by this time being sufficiently pressurized to prevent volatilization of the water in the silica hydrogel at the existing temperature, even though the temperature of the advancing mixture gradually exceeds the normal boiling point of water. Further compaction, pressurizing and heating of the mass are continued, while continuing the advance of the mass into a still hotter portion of the extruder, wherein the mass is compacted to its maximum density and the resin is heated to a soft, plastic, more or less fused condition in which it is readily flowable, especially under the influence of the stresses exerted on the mass by the extrusion screw. The now relatively fluid resin is thus mixed and churned at high temperature by the extrusion screw to form a continuous resin phase which flows around and between the particles of silica hydrogel to form an integral, homogeneous mass. At the same time, during this high temperature mixing, the particles of silica hydrogel are distributed uniformly throughout the mass, and the silica hydrogel also forms a continuous phase, which is interlocked with the continuous resinous phase.

Thereafter, the fused, mixed mass is advanced, still under pressure, and still at a temperature sufficiently high to permit it to be shaped, into a shaping zone of the extruder. Finally, the shaped mass is advanced and cooled, in a terminal section of the extrusion device, to a temperature sufficiently low so that the mass is shape-retaining and so that water does not escape explosively from the mass when the pressure is finally relieved by passage of the shaped mass out of the extruder into the free atmosphere. The resistance to flow of the relatively hard, cooled shaped mass out of the terminal end of the extrusion device serves to create back-pressure so that the desired compacting pressure, sufficient to prevent volatilization of water from the silica hydrogel in the hot zones of the extruder, can be maintained.

The most typical shape imparted to the mass is that of a flat sheet, whether planar or provided on one or both sides with ribs or ridges or depressions or other relief configurations. However, tubular or other shaped forms of microporous material may also be made by suitable modification of the shaping apparatus.

As a result of thus being fused into a homogeneous mass under confinement in a firmly compacted state, the resin forms a continuous phase which is a rigid, interlocking open network giving strength, rigidity and permanent shape to the whole mass, while the silica hydrogel forms another continuous phase, filling the interstitial spaces of the resin network. The confinement during the fusion step has served to prevent any substantial quantity of water from escaping from the system. The confinement is maintained until the shaped mass is cooled in order to prevent internal blowing or appreciable disruption of the shaped mass due to sudden vaporization of water when the pressure is released.

Thereafter, the rigid, fused shaped mass may be dehydrated. Because the resin is in a rigid, form-retaining state at the time when the dehydration takes place, undue shrinkage or change in shape of the resin structure as a whole does not occur. Innumerable interconnecting microscopic and sub-microscopic pores permeate the final mass prepared in this manner.

The silica hydrogel employed in the invention is a non-vitreous, friable material, made by known methods involving the partial dehydration of freshly precipitated silicic acid gels to a solids content of about 20 to 45%, for example, by the method of Baty and Meyer, U.S. Patent 2,329,322, issued September 14, 1943. The preferred hydrous silica gel contains from 25 to 40% solids. The particularly preferred high degree of microporosity in the final microporous resin product is obtained through the use of the more highly hydrous silica gel, that is, silica hydrogel having a total solids content of less than 32%. It is most preferred to use silica hydrogel having 28 to 32% solids. The gel in this degree of hydration may be easily ground to a particulate form.

The silica hydrogel is capable of undergoing extensive shrinkage upon further dehydration, a factor useful in the development of free and open pores. It is important to distinguish the silica hydrogel employed in the invention from the vitreous irreversibly dehydrated type of silica gel, which is not suitable for use in the invention. A peculiarity of the silica hydrogel is that in some manner that is not well understood at the present time, the hydrogel undergoes some sort of change when heated to elevated temperature under non-evaporative conditions (as it is in the course of the present process), whereby upon subsequent dehydration it yields a material that is quite unlike the ordinary vitreous dehydrated silica gel, in that it does not become vitreous but remains friable. The presence of water in the silica hydrogel in the present process is also believed to be beneficial from the standpoint of preventing the resin in a fused condition from entering into and clogging the pores of the gel particles. The silica hydrogel also contains a far greater percentage of voids than the vitreous type of dehydrated gel. Whether the superior result obtained in the present process using silica hydrogel is entirely a consequence of some or all of the foregoing factors, or whether the superior result is a consequence at least in part of other unknown factors, the experimental fact is that a microporous material of the present quality is not obtainable if the silica gel is completely dehydrated prior to using it in this process. In the present process the water of course remains in the silica hydrogel phase, since it is immiscible with the resin, that is, the water is of course not dissolved in or absorbed by the resinous phase.

In the typical practice of the invention, the powdered resin and silica hydrogel, and any other desired ingredients, are mixed together in any suitable equipment. The weight ratio of vinyl chloride resin to silica hydrogel is typically about 1:3, although other ratios can be used advantageously, e.g., from 1:4 to 1:1, in accordance with the degree of porosity desired in the final product. In making battery separators it is particularly desirable that the volume of silica hydrogel substantially exceed the volume of resin, and for this purpose the weight ratio of resin to hydrogel is preferably from 1:2 to 1:4. Lower ratios of resin to gel, e.g., 1:5 or 1:6 tend to give microporous products which are weak and cannot be used without extraneous support, although they are useful for some purposes when so supported.

An example of a suitable mixture according to our invention is as follows (parts by weight):

| | Parts |
|---|---|
| Polyvinyl chloride resin powder ("Marvinol VR–10" marketed by U.S. Rubber Co.) | 100 |
| Basic lead silicate sulfate (commercial stabilizer known as "Tribase E" marketed by National Lead Co.) | 5 |
| Silica hydrogel powder (25% solids) | 300 |

(It will be understood that any suitable conventional stabilizer or combination of stabilizers may be substituted for the one shown.)

The resultant mixture is a powder which tends to pack or bridge an orifice. In the preferred practice of the invention a mixture of the foregoing kind is fed continuously to extrusion devices of the kind illustrated in the drawings.

Referring to the drawings, and in particular to FIGS. 1 and 2, the extruder 10 shown therein is provided with an entrance or feed hopper 11 that is in communication with an internal barrel or bore 12 of the extruder. The extruder is suitably of the twin screw type, that is, there are two parallel intermeshing screws 13 and 14, both of which are rotated in the same direction by a common drive mechanism 15 at the rear of the extruder, and the extrusion screws extend from the rear or feed end of the extrusion barrel at the hopper forwardly to the delivery end of the extruder, which is fitted with a suitable die assembly 16.

Each extrusion screw is made in three distinct sections 17, 18 and 19, in the first of which (17) the screw thread is rather coarse and open and the root diameter is small, so that each flight or trough of the screw accommodates a rather large volume. In the subsequent section 18, the thread is somewhat finer and the root diameter is somewhat larger so that a reduced volume is provided in each screw flight. In the third section 19 of the screw, the thread is even more finely pitched and the root diameter is even larger, so that a further reduction in the volume of a given flight is effected. Also, in each successive section 17, 18 and 19, the external diameter of the screw thread is somewhat reduced, while the internal diameter of the extrusion barrel is correspondingly decreased in each section, thus contributing to the progressive reduction in volume of the extrusion passageway. Extruders of this kind are commercially available.

The hopper and the section of the extruder body in the neighborhood of the hopper contain internal passageways 20 through which cooling water is passed to maintain the material in the hopper and in the rearward section of the extruder barrel at a suitable low temperature. The intermediate section of the extruder body is provided with electrical resistance windings 21 for heating such section to an elevated temperature, while further electrical heaters 22, 23 toward the delivery end of the extruder body provide for heating the material in the forward section of the barrel to successively higher temperatures.

The die assembly 16 is made in two distinct sections 25, 26, the first of which (25) contains a converging entrance passageway 27 leading from the extrusion barrel passage into a gradually tapered passageway 28 in which the material being extruded is brought into the desired shape. Toward the forward portion of the passageway 28 suitable slots 29 are engraved for the purpose of forming ribs 30 on the final battery separator 31. Electrical heating coils 32 in the body of the first die portion permit the material to be heated to a temperature well above the fusion temperature of the resin.

The second section 26 of the die assembly contains a passageway 33 which is a continuation of the passageway 28 of the first portion. Passageways 34 for cooling water in the second section provide for cooling the extrudate within the final extrusion passage.

In operation, a material 35 comprised of resin and silica hydrogel, such as the mixture of powders illustrated above, is charged to the feed hopper 11 of the extruder while cooling water is circulated through the passageways 20 of the first part of the extruder in such manner as to maintain the powdered material at a temperature well below the boiling point of water, and in practice, it is actually preferred to cool the material in this section at least as low as room temperature. The first section 17 of the extrusion screw serves to begin compaction of the powder and to advance the thus cooled powder into the second section 18 in which appreciable compacting of the mass begins to take place, and in which heating of the mass, by means of the heating coils 21, is also begun.

As the material passes into the last section 19 of the extrusion barrel, still greater compaction of the mass takes place and successively higher temperatures are attained by means of the heating coils 22 and 23. In the last stage of the extrusion barrel the mass is thus compacted and pressurized to the maximum degree. The extruder screws and passageway are so proportioned that the theoretical compaction of the mass would be to about one-fourth of its original bulk, if the mass were sufficiently compressible and if no slippage occurred. In practice the actual compaction is much less, the important point being that the mass is subjected to definite, positive mechanical pressure by reason of the reduction of the volume of the available space to about one-fourth of the original value, as the mass advances. At this stage the mass also becomes heated to a temperature approaching or exceeding the fusion temperature of the resin. Ordinarily the water in the silica hydrogel would of course evaporate at such elevated temperatures, causing blowing of the mixture, but the arrangement and operation of the present apparatus are such that appreciable evaporation, sufficient normally to lead to blowing, is prevented because the material is at this point under a positive confinement by reason of the powdered material contained in the troughs of the extrusion screw rearwardly of the final zone, and by reason of the continuous forward positive pressure exerted on such powdered material by the continual rotation of the extrusion screws.

The soft, plastic mass is thus mixed and churned at elevated temperature by the action of the extrusion screws, with the result that the resin flows into a homogeneous, continuous, coherent mass, in which the particles of silica hydrogel, also as a continuous phase, are uniformly distributed. There are thus formed two continuous interlocking phases, one of fused resin and one of silica hydrogel. In the case of the vinyl chloride resin mixtures, the temperature at this stage will typically be in the range from 325° to 425° F., although even higher temperatures, e.g., up to 450° or even 500° F., may be maintained with properly stabilized material for brief periods of time, short of exposing the resin to such severe conditions that it is decomposed.

Continued forward movement of the heat-softened mass of plastic material and silica hydrogel causes the mass to be forced under pressure into the first section 25 of the die, where it may be heated by resistance elements 32. The finally desired shape of the battery separator 31 is thus imparted to the material, and the mass enters the final section 26 of the die in which it is cooled, while still confined in the desired shape under pressure, to a temperature at which it is rigid and form-sustaining. Because of the length of the extrusion die and because of the relative resistance to forward flow offered by the shaped mass within the terminal section of the die especially after the resin has been cooled to a temperature at which it is no longer in a plastic state, the material in the end portion of the die serves as a means for creating considerable "back-pressure," that is, this material offers sufficient frictional resistance to maintain the desired pressure rearwardly of the die exit where the high temperature zone is located.

After thus having been subjected to fusing heat, and cooled while confined in the desired shape under pressure, the shaped sheet 31 finally emerges from the extruder into the free atmosphere.

In the typical practice of the invention the shaped strip is thereafter dehydrated at least partially, and this may be done in a suitable hot air oven either before or after cutting the extruded strip into any desired length. The dehydration of the extruded strip is preferably carried out at a temperature well below the softening temperature of the resin, in order not to distort the shaped strip. It will be understood, however, that the strip is truly reticulately microporous even prior to any drying, except that the pores are of course filled with water. Thus, the extruded separator could, without any drying, be placed directly in a battery and, after the electrolyte has replaced the water in the pores by diffusion, the porosity and electrical resistance would be just the same as if the separator had been dried first. However, for convenience in packing and economy in shipping, the ordinary practice is to dry a good part of the water out of the separator at the conclusion of the process.

In accordance with the modification of the invention shown in FIGS. 4–7, there may be employed an extrusion device 40 equipped with twin screws 41, 42 essentially as described previously but having terminal extensions or flighted "torpedoes" 43, 44 to provide for greater heat transfer in this zone. The modified extruder shown has an overhead hopper arrangement comprising an inverted cone-shaped container 45 (FIG. 5) standing on a water-jacketed cylinder 46 all of which contain an open flighted screw 47 which compresses and delivers the powdered stock 48 to the screws 41, 42 of the extruder proper. The cooled section 46 serves to keep the material in the hopper from becoming heated because of heat conducted backwardly from the extremely hot material in subsequent sections of the extrusion apparatus. The screw 47 in the feed hopper is designed and driven in such manner that the stock is compacted and reduced in bulk as it passes through the hopper.

A suitable modified formulation for the battery separator stock charged to the feed hoper is as follows:

|  | Parts by weight |
|---|---|
| Polyvinyl chloride resin ("Marvinol VR–10", U.S. Rubber Co.) | 100 |
| Basic lead silicate sulfate (commercial stabilizer "Tribase E," National Lead Co.) | 5 |
| Non-volatile plasticizer | 12 to 25 |
| Silica hydrogel powder (68% water) | 380 |

It will be understood that any suitable conventional plasticizer or combination of plasticizers may be used. High boiling esters such as dioctyl phthalate may be mentioned as well as essentially non-volatile hydrocarbons, such as the material known as S/V Solvaloid C (Socony-Mobil Co.), which is largely a mixture of alkylated three-and four-ring aromatic hydrocarbons obtained from petroleum, having a specific gravity of 1.05 (60/60) a viscosity at 100° F. of 82 (SUS) and at 210° F. of 35 (SUS), a flash point of 350° C. (COC), a pour point of −25° F., an ASTM color of 4, a mixed aniline cloud point of 69° F., and the following distillation range: Initial boiling point 598° F.; 5% at 614° F.; 10% at 620° F.; 50% at 648° F.; 90% at 684° F.; and a final boiling point of 723° F.

Although the foregoing composition contains a plasticizer, it is important to note that the thus-plasticized resin is, at ordinary temperatures, definitely a hard, rigid material, unlike solvent-softened vinyl resin which is a soft, jelly-like mass at room temperature. The presently employed resin composition, even when it contains plasticizer, is not soft and plastic at ordinary temperature but instead requires a temperature well in excess of the boiling point of water, e.g., at least 325° F., before it is soft and readily flowable into a homogeneous, continuous phase under the influence of the mixing action of the extrusion screw. For the present purpose we employ conventional plasticizers, typically essentially non-volatile materials under ordinary conditions, in amounts up to 50 parts per 100 parts by weight of resin. Those plasticizers known as primary plasticizers are usually used in amounts of 10 parts or less, while those plasticizers known as secondary plasticizers are usually used in larger amounts.

Various stages of the extruder body and die assembly are provided with heating elements (FIG. 5) 50, 51, 52, and 53, by means of which the stock may be heated to a desired temperature at any particular stage. The extruder screws 41, 42 have a 4:1 compression ratio so that by the time the stock is heated the screws are absolutely full with separator stock providing no space for steam flashing. As the stock is compressed and advanced it is progressively heated to a higher temperature by means of the heaters 50, 51 and 52, until in the zone containing the torpedoes 43, 44 the thermoplastic resin composition is at a temperature well in excess of its softening temperature, and is in a soft, essentially fused state. The primary function of the torpedo zone is to increase the transfer of heat to the mixture, rather than to subject the mixture to further compaction. The compaction action is exerted mainly by the screws in the previous sections. In the torpedo section the mixture is spread out into a thinner mass, into which heat can be introduced more rapidly. With the formulation shown, the stock is typically progressively heated to approximately 300° F. in the screws 41, 42 and then to 375–400° F. in the torpedo or plasticizing zone. In this state the stock is mixed and churned and advanced by the flighted torpedoes, and the resin (along with the plasticizer, if present) flows into a homogeneous, uniform, continuous phase that forms a strong (upon cooling), integral structure with the silica gel dispersed uniformly therein also as a continuous phase, all as described previously.

The hot, fused stock flows through a converging transition passageway 62 and thence into a tapered die passageway 63 in which the hot plastic stock is forced into a sheet like shape of somewhat greater thickness than the finally desired size. The partially shaped stock in the die passageway is maintained in the soft, fused condition (e.g., typically at a temperature of 350°–400° F.) by means of the heaters 53 in this section.

The die assembly includes a driven rotary drum member 65 mounted for rotation within a concave portion 66 of the die which forms a kind of shield partially enclosing the drum. The drum is rotated, by a drive mechanism 67, in the same direction as the stock is moving and the peripheral speed of the drum is essentially the same as the linear speed of the stock in this section, so that the stock and drum move essentially as a unit, the two being in frictional engagement with each other. The drum assists and controls movement of the stock.

At the upper exit edge of the tapered passageway 63 there is provided a transverse sealing member 68 which bears firmly against the surface of the drum, thus preventing loss of steam from the stock at this point. The seal 68 is preferably comprised of a polytetrafluoroethylene composition (e.g., "Rulon A" made by Dixon Corp.), a low-friction or self-lubricating material, internally reinforced as with wire screening or glass cloth to give it strength and maintain it in place. The seal 68, being of essentially non-heat-conducting nature, also provides heat-insulation between the heated portion of the die and the drum, to prevent the drum from becoming heated.

A final shaping or extrusion passageway 70, (see the enlargements, FIGS. 6 and 7) having the finally desired size and shape, is defined between the lower portion of the drum and the concave surface of the shield. In this area the shield if surfaced or lined with a low-friction or self-lubricating member 71 which may be made of the same material as the seal 68. The drum is cooled, either by reason of the fact that a large part of it is exposed to the air, or by circulating cooling water through the hollow interior 72 of the drum. The terminal section of the shield 66 is similarly cooled by means of cooling passageways 73. This chills the stock in the passageway 70 so that as the hot stock is forced into its final shape it is at the same time subjected to a cooling operation, and becomes solid and form-sustaining. In this condition the now essentially non-flowable stock has great frictional resistance to movement through the remainder of the passageway 70 because of its contact with the drum surface. There is thus provided a kind of snubbing action and substantial back pressure is created within the extrusion device because of the resistance of this material to the forwardly exerted pressure of the various screws in the extruder. The low-friction stationary surface 71 on the shield serves to prevent undue resistance to forward movement of the stock, since excessively high pressure within the extruder is undesirable. At the same time the cooled rotating drum surface, being in frictional engagement with the stock, serves to control the rate of advancement of the stock as it is forced into the desired shape and cooled to an essentially rigid state.

It will be observed that with this arrangement the stock enters the final shaping and snubbing passageway in a hot, flowable condition (e.g., at 350°–400° F.) and immediately as the final shape is imparted to the stock, cooling is commenced and as the stock advances in the desired shape the temperature is reduced to the point (below 212° F., and preferably well below that temperature) where the product is rigid and form-sustaining and there is no tendency for water to flash off disruptively as the product 74 finally passes out of the extrusion apparatus into the free atmosphere.

The microporous sheet in the form of a battery separator thus produced is characterized by excellent resistance to the usual battery electrolytes, low electrical resistivity and good physical characteristics desirable in a battery separator, such as rigidity, good impact strength, high voids, good resistance to oxidation, and uniformity of dimensions. On a volume basis, there are to be found in the separator typically 50–75% voids in the form of interconnecting micropores, which micropores are sufficiently fine to prevent treeing of lead from the storage battery electrodes and resultant short-circuiting, while at the same time the pores are sufficiently large and numerous to permit free flow of ions through the electrolyte permeating the separator. The separator is readily wetted and re-wetted by the electrolyte, because of the hydrophylic nature of the silica gel. The separator is highly resistant to battery acid. It is unaffected by wetting and drying and may be incorporated in "dry-charge" batteries without damage to the product.

From the foregoing it will be apparent that the invention provides a novel and convenient method of making microporous material from vinyl resin. The use of an extruder as described makes it possible to carry out the process essentially continuously if desired. Because of the manner in which the mixed powder is stuffed under pressure into a positively confined shaping zone, it is possible to heat the powder in such zone to a temperature in excess of the boiling point of water, and sufficiently high to fuse the resin, without concomitant evaporation of water from the silica hydrogel.

Because the resin is worked and mixed within the extruder at a temperature at which it is readily flowable, the resin forms one homogeneous and continuous phase which is a strong, integral and unitary structure. During such mixing in the plastic state the silica hydrogel particles are uniformly dispersed throughout the mix and the resin actually flows around and between the hydrogel particles, which are present in such proportion that they also form a continuous phase, intertwined with the continuous resin phase. It is important to note that this homogeneous nature and continuity of the resin phase is independent of the particulate nature or size of the resin particles as charged to the extrusion device. The original particles completely lose their identity and merge into one single mass by reason of being worked and mixed at high temperature in the extruder. Thus, chips, chunks, or even continuous strips or rods of resin could be charged to the extrusion device, along with silica hydrogel in the proper proportions, and the present final structure, with two interlocking continuous phases, would still be produced. However, for convenience, especially in properly regulating the proportions, we ordinarily prefer to make a premix of the particulate resin and hydrogel, as described.

Because of the manner in which provision is made for snubbing the product subsequent to the final shaping zone, it is possible to maintain the pressure required to prevent evaporation as the shaped mass is advanced and simultaneously cooled in the sunbbing zone, so that by the time the shaped mass finally issues from the die it is rigid and has been cooled well below 212° F. and well below the softening point of the resin, and therefore explosive or disruptive evaporation cannot take place.

The method of giving coherent structure to the material by heating to fusing temperature while under positive confinement is particularly advantageous in that it dispenses with the use of volatile solvents to render the resin structure continuous and homogeneous. This represents a considerable convenience and economy in the present method, and it also dispenses with the toxicity and fire hazard frequently associated with solvent processing, not to mention the expense of the solvent and the time consumed in utilizing and recovering it. In fact, the positive confinement employed while shaping and setting the resin in the present process makes it perfectly feasible to utilize fusing temperatures that are sufficiently elevated to be operative with vinyl resin that is devoid of plasticizer, or contains only a minor proportion of plasticizer. Thus, preferred resin compositions having fusion temperatures will in excess of the boiling point of water, e.g., fusion temperatures in the range from 300° to 425° F., as typified by the usual rigid vinyl resin, can be employed without difficulty. The ability to utilize rigid vinyl resin makes it possible to attain optimum physical properties.

It is important to note that the present method provides for maintaining the pressure on the stock at all times greater than the vapor pressure exerted by the volatile material (essentially water) in the stock at the temperature of the stock. This is illustrated in FIG. 8 of the drawing, wherein the internal stock pressure and the vapor pressure at stock temperature, are plotted on a vertical scale, while the successive zones of the extrusion device are indicated on the horizontal scale in their proper relative positions. The graph in FIG. 8 is not intended to be an exact quantitative indication of specific pressures, but is presented merely to illustrate typical general relationships between the pressures at successive stages. It will be seen that in the initial portion of the device (compressing zone) the stock is subjected to a relatively gradually increasing pressure, while the vapor pressure remains for the first part of this stage at a very low level, since the stock is not heated at this point, but is cool. Toward the end of the compressing zone the stock temperature becomes substantial and vapor pressures approaching 100 p.s.i. are developed, by reason of the elevated temperature in this zone, but by this time the pressure on the stock is much greater than 100 p.s.i. By the time the stock reaches its maximum temperature in the plasticizing and forming zone, the pressure on the stock has jumped to a value of 600 p.s.i. or more; and it therefore still more than double the vapor pressure at that maximum temperature. This high stock pressure is a consequence of, and is made possible by, (1) the plug of relatively cool, non-plastic stock at the entrance to the extruder, (2) the positive pressurizing action of the interlocking twin screws of the extruder, (3) the gradually decreasing volume of at least certain portions of the extrusion passageway (and the substantial absence of any increase in volume at any portion of the extrusion passageway), and (4) the snubbing of the cooled material at the exit end of the device.

At the same time it is desired to emphasize that excessively high pressure should not be exerted on the stock because it becomes exceedingly more difficult mechanically to maintain an adequate seal to hold the high temperature stock within the confines of the extrusion apparatus. Such high pressure may cause the water to be expressed from the silica hydrogel, especially if there is substantial escape of material at joints of the extruder, thus rendering the final product less microporous. It will be understood that it is the water in the silica hydrogel that accounts for the pores in the final product, and such pores will be micropores, as desired, only as long as the water remains microporously distribtued within the colloidal structure of the gel particles. Therefore we avoid application of pressures in excess of about 700 p.si. on the stock, in the typical practice of the invention.

As an assistance in developing the desired pressure within the extruder when first starting up the process several expedients may be found convenient. If desired, the extruder may be started cold, or at least below the boiling point of water, and after the stock has completely filled the apparatus, the temperatures may be raised to the normal operating temperatures in the various sections of the extruder. Alternatively, the extruder may be started hot, but the silica hydrogel may be omitted until the device is filled, whereupon charging of the desired stock containing silica hydrogel may be commenced. If desired, for the purpose of starting up the apparatus, the silica hydrogel may be replaced (volume for volume) in the stock by a low-melting thermoplastic material, such as polyethylene. In any case, there must be no substantial voids within the stock in the steady operating condition, because once any such voids are created (as would happen if the extrusion and die passages were not filled completely with compacted stock, or if the stock pressure at any point were even momentarily less than the vapor pressure at that point), only an unsatisfactory, discontinuous product is discharged from the extruder, sometimes with irregularity and violence, and it is difficult, if not impossible, to re-establish a proper operating condition. The starting methods described insure that a solid plug of material will be formed in the snubbing zone at the terminal end of the extruder, thus permitting the extruder screws to build up quickly the desired pressure in the confining zones of the extruder. Thereafter, the separator stock at all times fills completely all of the space in the entire extrusion passageways, in a compacted, positively pressurized condition.

It will be noted that in the present method the compaction and pressurizing of the mass is commenced while the mass is still in a relatively cool condition, in which the resin composition is rigid and non-plastic, at the entrance zone of the extruder, and heat is not applied until after the advancing mass is under definite compaction and pressure. Thus, the compacted non-plastic mass at the entrance zone of the extruder in the unheated state serves as a kind of plug or stop, to prevent any substantial backward escape of pressurized vapors from the subsequent heated portions of the mass.

Having thus described our invention, what we claim and desire to protect by Letters Patent is:

1. A method of making a shaped microporous article comprising in combination the steps of advancing into a confined space a thermoplastic resin and silica hydrogel containing 20 to 45% solids, the weight ratio of resin to hydrogel being from 1:1 to 1:4, the said resin and hydrogel being initially maintained in an unheated condition, compacting and positively pressurizing the said materials while advancing the materials in said confined space to a zone wherein the materials are heated to an elevated temperature sufficient to fuse the resin, said temperature being in excess of the boiling point of water at atmospheric pressure, mixing the thus confined materials at said elevated temperature to disperse the silica hydrogel uniformly throughout the resin and to cause the resin to flow around and between the dispersed silica hydrogel to form a homogeneous, continuous resin phase, the silica hydrogel also being present as a continuous phase intertwined with said resin phase, shaping the mass into a desired shape while hot and while still under pressurized confinement, cooling the still confined mass to a temperature below the boiling point of water at atmospheric pressure, and thereafter releasing the cooled, rigid, shaped mass from confinement, the pressure on the material under confinement being greater than the vapor pressure of water at the temperature existing in the material, whereby the water remains as such microporously distributed within the silica hydrogel throughout said steps.

2. A method of making a shaped microporous article comprising in combination the steps of mixing vinyl resin and silica hydrogel containing 25 to 40% solids, the weight ratio of resin to hydrogel being from 1:2 to 1:4, advancing said mixture into an extrusion device having a confining space of progressively decreasing volume and a terminal exit passage, the said mixture being in an initially unheated condition, subjecting the mixture within the confining space to positive pressure and compacting it into said decreasing volume, advancing the compacted mass into a heated zone wherein the mixture is heated to a temperature in excess of the fusion temperature of the resin, said temperature being in excess of the boiling point of water at atmospheric pressure, working the mixture at such elevated temperature while still under positive confinement to distribute the silica hydrogel uniformly throughout the resin and to cause the resin to flow around and between the particles of silica gel to form a homogeneous, continuous resin phase, the silica hydrogel also forming a continuous phase that interlocks with the resin phase, shaping the mixture while in a hot, plastic condition into the desired shape, advancing the mixture through the said terminal exit passageway while cooling the same to a temperature which is below the normal boiling point of water and at which the resin is rigid and form-sustaining, the cooled mixture in the exit passageway serving to maintain back-pressure within the said confining space by reason of frictional engagement between the mixture and a surface of said passageway, the pressure on the material under confinement being greater than the vapor pressure of water at the temperature existing in the material, but less than 700 pounds per square inch, whereby the water remains as such microporously distributed within the silica hydrogel throughout said steps.

3. A method of making a microporous battery separator comprising in combination the steps of mixing rigid polyvinyl chloride resin having a fusion temperature in the range from 325° to 425° F. in powdered form with finely divided silica hydrogel, the weight ratio of resin to hydrogel being from 1:2 to 1:4, the said silica hydrogel containing from 25 to 40% solids, advancing the powdered mixture through an extrusion device having a feed end and a delivery end, cooling the mixture in the neighborhood of the said feed end, progressively compacting the mixture while advancing it under positive pressure toward the said delivery end, and progressively heating the mixture as it is advanced to a temperature in the range of 325° to 425° F. while agitating the mixture to cause the resin to flow around and between the particles of silica hydrogel and whereby the particles of resin flow together and lose their original identity, the resin thereby forming a homogeneous, integral, continuous phase and the silica hydrogel particles being distributed uniformly throughout the mixture, also as a continuous phase interlocked with said resin phase, thereafter advancing the still pressurized mixture and imparting the shape of a battery separator thereto, cooling the mixture in such shape at the said delivery end of the device to a temperature below the boiling point of water at atmospheric pressure, the cooled shape serving to maintain back pressure in the device by reason of frictional resistance to flow of the cooled shape in said delivery end, and thereafter advancing the cooled shape out of said delivery end, the pressure on the mixture within the device being greater than the vapor pressure of water at the temperature existing in the material, but less than 700 pounds per square inch, whereby the water remains as such microporously distributed within the silica hydrogel throughout said steps.

4. A method of making a microporous battery separator comprising in combination the steps of providing a polyvinyl chloride resin that is devoid of volatile solvent and that has a fusion temperature in excess of the boiling point of water at atmospheric pressure, said resin being admixed with silica hydrogel containing from 28 to 32% solids, advancing the mixture through an enclosed extrusion device having a feed end and a delivery end, said ends being connected by an extrusion passageway the volumetric capacity of which is less toward the delivery end than it is toward the feed end, whereby the mixture becomes compacted as it advances under confinement through the device, progressively heating the mixture as it advances through the device to a temperature in excess of the fusion temperature of the resin, agitating the mixture while it is thus confined and heated to produce a mass in which the resin exists as a continuous phase intertwined with the silica hydrogel also as a continuous phase, imparting the desired shape of a battery separator to the mixture while in a heated, confined condition within the device, thereafter advancing and cooling the shaped mixture to a temperature below the normal boiling point of water while still confined in the device, and subsequently passing the cooled, shaped mixture from the device.

5. The method of making a microporous battery separator comprising in combination the steps of providing a polyvinyl chloride resin that is devoid of volatile solvent and that has a fusion temperature in the range of from 325° to 425° F., said resin being admixed with silica hydrogel containing from 28 to 32% solids, advancing the mixture through an enclosed extrusion device having a feed end and a delivery end, said ends being connected by an extrusion passageway the volumetric capacity of which is less toward the delivery end than it is toward the feed end, compacting the mixture in the area of the feed end in an unheated condition, forcing the mixture through said passage with further compaction and heating to a temperature of from 325° to 425° F. while churning the mixture to produce a mass in which the resin exists as a continuous phase intertwined with the silica hydrogel also as a continuous phase, thereafter shaping the mass into the form of a battery separator while the mass is still confined in a heated, pressurized condition, thereafter cooling the battery separator to a temperature below 212° F. while still confined, the thus-cooled battery separator serving to create frictional resistance to flow of material out of the extrusion device at said delivery end, and the said compacted unheated mixture at the feed end serving to seal off the extrusion passageway at said feed end, whereby there is maintained, on the heated material confined in the extrusion passageway, a pressure substantially in excess of the vapor pressure of the water in such heated material.

References Cited in the file of this patent

UNITED STATES PATENTS

| | | |
|---|---|---|
| 2,302,832 | Behrman | Nov. 24, 1942 |
| 2,329,322 | Baty | Sept. 14, 1943 |
| 2,354,260 | Haney | July 25, 1944 |
| 2,365,375 | Bailey et al. | Dec. 19, 1944 |
| 2,736,064 | Rubin | Feb. 28, 1956 |
| 2,987,774 | Jacobson | June 13, 1961 |